United States Patent [19]
Yoshino et al.

[11] Patent Number: 5,587,823
[45] Date of Patent: Dec. 24, 1996

[54] RADIO COMMUNICATION DEVICES

[75] Inventors: Hiroyuki Yoshino, Higashiyamato; Takashi Kojo, Ome, both of Japan

[73] Assignee: Casio Computer Co., Ltd., Tokyo, Japan

[21] Appl. No.: 170,502

[22] Filed: Dec. 20, 1993

[30] Foreign Application Priority Data

Dec. 28, 1992 [JP] Japan ................................. 4-349579

[51] Int. Cl.⁶ ............................................. H04B 10/10
[52] U.S. Cl. ..................... 359/143; 359/152; 340/505; 340/815.53; 340/815.54
[58] Field of Search ........................... 359/152, 143, 359/113; 340/505, 815.53, 815.54, 815.6

[56] References Cited

U.S. PATENT DOCUMENTS

| | | | |
|---|---|---|---|
| 4,173,016 | 10/1979 | Dickson | 340/505 |
| 4,348,740 | 9/1982 | White | 364/419 |
| 4,626,848 | 12/1986 | Ehlers | 359/143 |
| 4,728,949 | 3/1988 | Platte et al. | 340/825.37 |
| 4,882,776 | 11/1989 | Uzawa | 359/172 |
| 4,885,804 | 12/1989 | Mayle | 359/152 |
| 4,930,011 | 5/1990 | Kiewit | 359/143 |
| 4,941,201 | 7/1990 | Davis | 359/143 |
| 5,086,394 | 2/1992 | Shapira | 340/825.44 |
| 5,117,358 | 5/1992 | Winkler | 364/410 |
| 5,219,291 | 6/1993 | Fong et al. | 434/323 |

FOREIGN PATENT DOCUMENTS

| | | | |
|---|---|---|---|
| 0120345 | 10/1984 | European Pat. Off. | 340/825.73 |
| 0275124 | 7/1988 | European Pat. Off. | |
| 0313976 | 5/1989 | European Pat. Off. | |
| 3-120918 | 8/1991 | Japan . | |
| 3-129572 | 12/1993 | Japan . | |
| 2240009 | 7/1991 | United Kingdom . | |

OTHER PUBLICATIONS

Database WPI, Week 9148, Derwent Publications Ltd., London, England, AN 91-354088 & ZA-A-9 008 737 (Grinaker Eltrn Ltd) Aug. 28, 1991.

*Primary Examiner*—Leslie Pascal
*Attorney, Agent, or Firm*—Frishauf, Holtz, Goodman, Langer & Chick

[57] ABSTRACT

Data on various conversation sentences are sent/received by radio between radio communication devices remote from one another. Many conversation sentence data items and different code data items are beforehand stored in a corresponding relationship in a conversation sentence data storage ROM. When one of the conversation sentence data items is selected by operation of a select switch, a corresponding code data item is sent to a receiving end, which is provided with a ROM having the same contents of storage as the ROM. A conversation sentence is read from the ROM in accordance with the received code data and displayed on a display.

5 Claims, 15 Drawing Sheets

BASIC PART PATTERNS IN ROM

| PART \ NO. | 1 | 2 | 3 | | | 50 |
|---|---|---|---|---|---|---|
| 3A-1 → CONTOUR | ∪ | ∪ | ∨ | | | ∪ |
| 3A-2 → HAIR STYLE | ⌒ | ∩ | ⌒ | | | ⋏ |
| 3A-3 → EYES | ⌒ ⌒ | ✻ ✻ | ⊖ ⊖ | | | T T |
| 3A-4 → NOSE | c | ∠ | ⌃ | | | ⌒ |
| 3A-5 → MOUTH | ▼ | ∨ | ⊖ | | | ∞ |

FIG.3

EXPRESSION CHANGE PATTERNS IN ROM

FIG.4A

|  |  | 1 | 2 | 3 |  |
|---|---|---|---|---|---|
| 3B-1A | EYES | ◠ ◠ | 👁 👁 | ◉ ◉ |  |
| 3B-2A | MOUTH | V | ∪ | ⊖ |  |

FIG.4B

|  |  | 1 | 2 | 3 |  |
|---|---|---|---|---|---|
| 3B-1B | EYES | (. .) | 😢 | ◔ ◔ |  |
| 3B-2B | MOUTH | ∧ | ⌒ | ⌓ |  |

FIG.4C

|  |  | 1 | 2 | 3 |  |
|---|---|---|---|---|---|
| 3B-1C | EYES | ＞＜ | ✕ ✕ | ◑ ◐ |  |
| 3B-2C | MOUTH | ∧ | ⌒ | (( ◯ |  |

|   |   |   |   |
|---|---|---|---|
| X | Let's play ? | HAPPY | SAD |
| Y | Please tell me an answer to our assignment ? | HAPPY | ANGRY |
| Z | Please forgive me ? | BASIC | BASIC |
| S | OK ! | | |
| T | NO ! | | |

| | | | DISPLAY REGISTER | | | | | |
|---|---|---|---|---|---|---|---|---|
| n | f | ℓ | | | | | | |

| | | USER'S MONTAGE DATA | | | | | |
|---|---|---|---|---|---|---|---|
| NAME | TEL | ADDRESS | CON-TOUR | HAIR | EYES | NOSE | MOUTH |
| TARO YAMADA | oooooo | ooo, TOKYO | 1 | 2 | 3 | 2 | 1 |
| | | | | | | | |
| | | | | | | | |
| | | | | | | | |

61 — Display Register
62 — User's Montage Data
63-1, 63-2, 63-3

(USER'S MONTAGE)

| CONTOUR | HAIR | NOSE | EYES | MOUTH |
|---------|------|------|------|-------|
| NO.2    | NO.3 | NO.1 | NO.1 | NO.2  |

(THE OTHER'S MONTAGE DATA)

| CONTOUR | HAIR | NOSE | EYES | MOUTH |
|---------|------|------|------|-------|
| NO.1    | NO.2 | NO.2 | NO.2 | NO.1  |

RADIO COMMUNICATION DEVICES

BACKGROUND OF THE INVENTION

The present invention relates to radio communication devices which have simple conversation with others by radio.

So-called remote control devices which control the operation of electronic devices such as television sets or video tape recorders, using an infrared control signal, are sold as commodities. Infrared signals are used not only to control the operation of the electronic devices, but also to send and/or receive information composed of character data and/or numerical data between two electronic devices.

In order to send and/or receive information such as character data and numerical data using an infrared radio signal, the information is required to be set by the operation of keys of a device on the side of the transmission and a circuit which decodes all the characters and numerical data received from the other party must be provided on the side of the transmission. Thus, the structure of the device of the transmission side is undesirably complicated. When image information different from the character and numerical data is sent and/or received, a more complicated structure is required.

SUMMARY OF THE INVENTION

It is therefore an object of the present invention to provide a radio communication device which has a very simple structure and requires only a very simple operation to send and/or receive information.

It is another object of the present invention to provide a radio communication device which has a very simple structure to send and/or receive image information, in addition to character data and/or numerical data.

In order to achieve the above objects, according to the present invention, there is provided a radio communication device which sends and/or receives data to and/or from the other party's radio communication device, comprising:

conversation sentence data storage means for storing a plurality of conversation sentence data items;

conversation sentence selecting means for selecting one of the plurality of conversation sentence data items stored in the conversation data storage means;

sending means for sending to the other party's radio communication device radio data corresponding to the conversation sentence data selected by the conversation sentence selecting means;

receiving means for receiving radio data from the other party's radio communication device;

determining means for determining which of the conversation data items of the plurality stored in the conversation sentence data storing means the radio data received by the receiving means corresponds to; and display means for displaying conversation sentence data corresponding to the received data determined by the determining means.

BRIEF DESCRIPTION OF THE DRAWINGS

FIG. 3 shows data on the basic part patterns of a face stored in a ROM (Read Only Memory) of the device.

FIGS. 4A, 4B, and 4C show data on expression change patterns stored in the ROM.

FIG. 5 is a table of question/response data stored in the ROM.

FIG. 6 shows the internal structure of a RAM (Random Access Memory) of the device.

DETAILED DESCRIPTION

An embodiment of the present invention will be described next with reference to the accompanying drawings.

Figure 1:
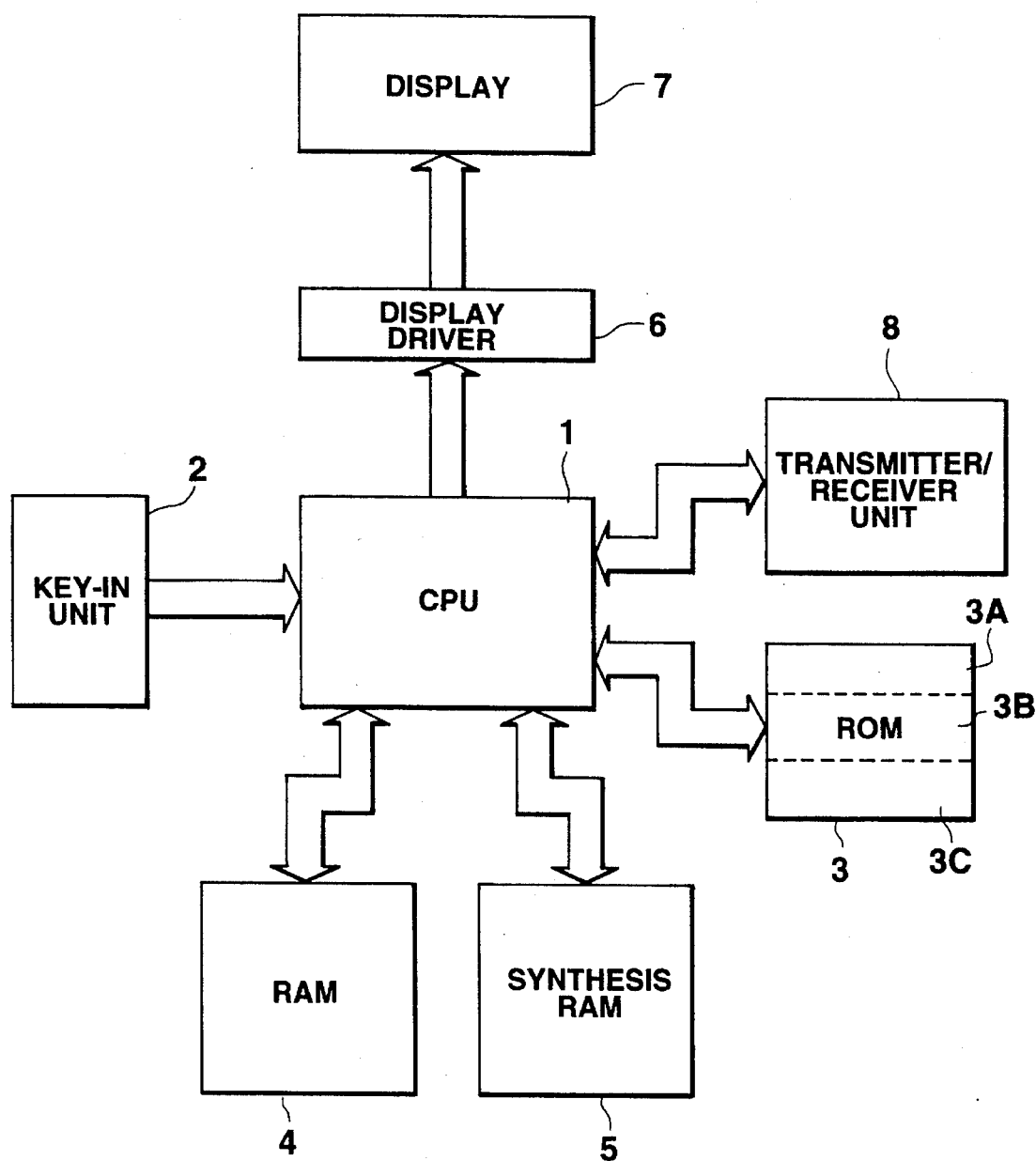
FIG. 1 is a block diagram of an internal circuit of a radio communication device as one embodiment of the present invention.

FIG. 1 is a block diagram of the internal circuit of a radio communication device as one embodiment of the present invention.

In FIG. 1, a central processing unit (CPU) 1 which includes a microprocessor or the like controls the whole operation of the radio communication device on the basis of a microprogram stored in a built-in ROM (not shown).

CPU 1 is connected to a key-in unit 2, a ROM 3, a RAM 4, an image synthesis RAM 5, a display driver 6 connected to a display driver 7, and a transmitter/receiver unit 8.

The key-in unit 2 includes a keyboard with many kinds of depression-type switches where a depressed switch outputs a key-in signal to CPU 1.

ROM 3 stores face pattern data and question/answer data, as shown in FIGS. 3–5, which will be described later in more detail.

RAM 4 comprises registers which store predetermined data. CPU 1 reads/writes data from/in the RAM 4.

The synthesis RAM 5 is a bit image memory on which a face montage is synthesized from face pattern data items designated by input data or from which the synthesized montage data is read.

The display driver 6 comprises a decoder, driver, etc., and decodes display data received from CPU 1, produces and outputs a display drive voltage signal to the display 7, which comprises a dot matrix type liquid crystal display which makes a predetermined display on the display in accordance with the voltage signal from the display driver 6.

The transmitter/receiver unit 8 comprises a transmitter circuit (not shown) which includes an LED (Light Emitting Diode) and a switching FET (Field Effect Transistor); and a receiver circuit (not shown) which includes a photodiode or a phototransistor, an amplifier, and a low pass filter. The transmitter circuit converts a parallel signal from CPU 1 to a serial high-low electric signal, which turns on/off the switching FET and hence the LED to thereby output an infrared optical signal including predetermined data. In the receiver circuit, its photodiode (or phototransistor) is turned on/off in response to an optical signal from an LED of a transmitter circuit of the other party to convert the optical signal to an electric signal, amplifies this signal, extracts only the frequency components of the LED emission signal from the amplified electric signal, converts the frequency signal to a parallel digital signal, and outputs this signal to CPU 1.

Figure 2:
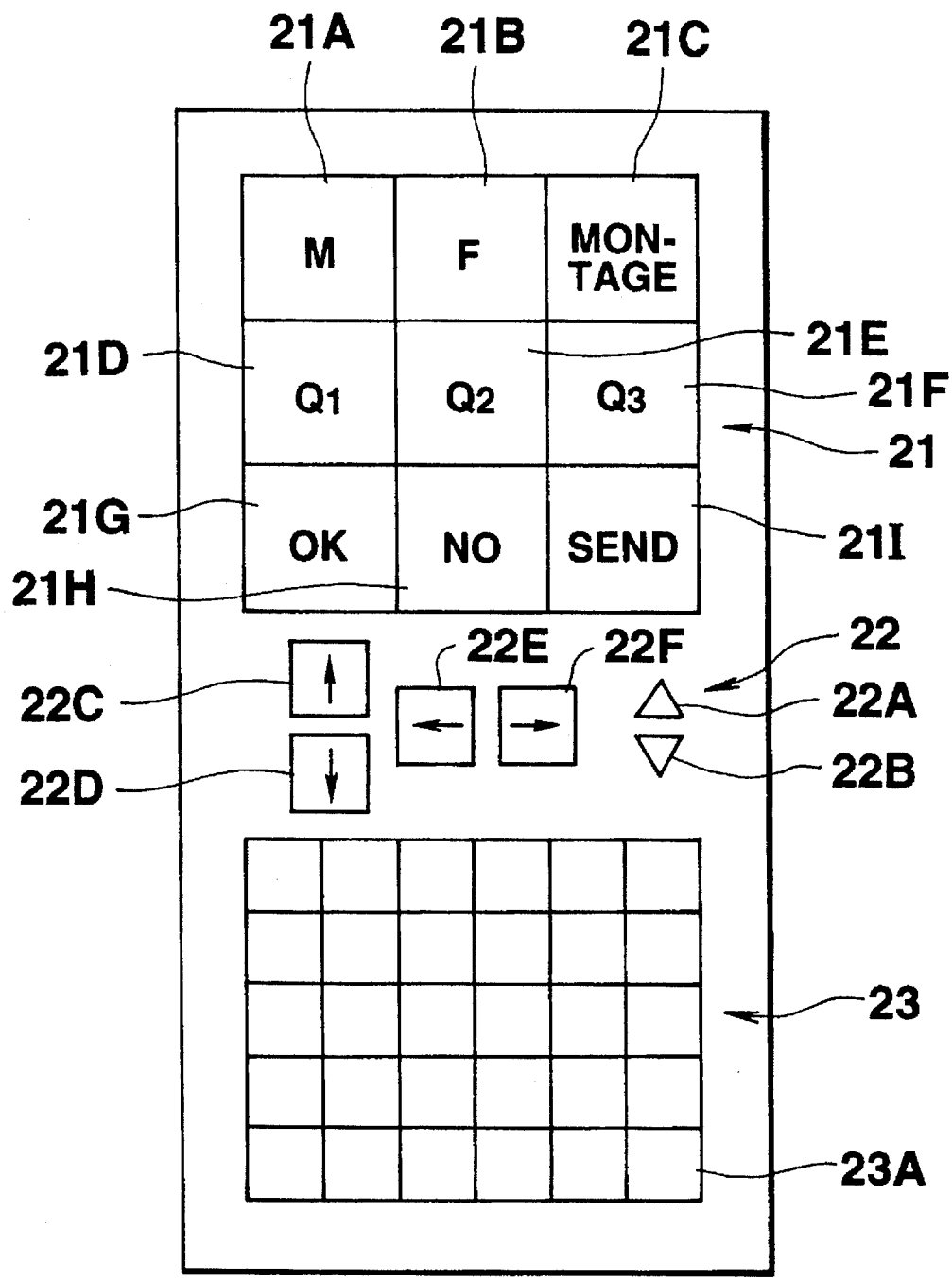
FIG. 2 shows the appearance of a key-in unit of the device.

FIG. 2 shows the structure of the keyboard of key-in unit 2. The keyboard comprises a designating key unit 21 comprises 9 (3×3) designating keys disposed vertically and horizontally in an upper portion of the keyboard, a select key unit 22 comprising 4 cursor keys with upward, downward, rightward and leftward arrows thereon and provided in the middle portion of the keyboard, and two select keys with upward and downward triangular key pads; and a data key-in unit 23 comprised of data input numerical keys and character keys disposed in a lower portion of the keyboard.

An M key 21A of the designating unit 21 is an operation mode designating key. Each time it is operated, the operation mode is switched alternately between a normal mode in which calculation and data transmission/reception are performed and a data creation mode where a montage is created or calling or visiting card data is input.

An F key 21B is a user's/the other party's mode designating key. Each time it is operated in the data creation mode, the operation mode is switched alternately between a user's montage creation mode in which the user creates his portrait montage and a data bank (DB) data/montage creation mode in which a portrait montage of a person different from the user is created.

A montage creation key 21C is an input mode designating key. Each time it is operated in the data creation mode, the operation mode is switched alternately between the montage creation mode and the character (numerical) data input mode.

A Q1 key 21D, a Q2 key 21E and a Q3 key 21F each are a question designating key which is operated to select a corresponding one of three kinds of questions to be described later in more detail.

An "OK" key 21G and a "NO" key 21H are respective response designating keys which are operated to select two corresponding kinds of responses YES and NO.

A sending transmission key 21I is a transmission commanding key which is operated to send transmission data designated by the respective designating keys from the transmitter/receiver unit 8 of FIG. 1 to the outside.

The two upward and downward triangular basic pattern select keys 22A and 22B disposed in the right-hand middle portion on the keyboard are each operated to select a basic type of basic part patterns of a montage be described later in the montage creation mode of the data creation mode. The four upward, downward, rightward and leftward arrowed cursor keys 22C, 22D, 22E and 22F disposed to the left of the two select keys 22A, 2B are part select keys which are operated to select part data items of the basic type of the selected basic part pattern of the montage.

The numerical keys and character keys of the input unit 23 disposed in the lower portion of the keyboard are operated to input character data such as the first name, second name, and address of a person and numerical data such as his telephone numbers to the device in the character (numeral) input mode of the data creation mode. The input unit 23 further includes a record key 23A which is operated to record question data and response data designated by the corresponding designating keys and basic part pattern data items selected by the corresponding select keys.

FIG. 3 shows data on basic part patterns of a face stored in a first storage area 3A of ROM 3. In FIG. 3, the basic part patterns include 50 patterns numbered "1"–"50" disposed from left to right for each of a "contour" part 3A-1, a "hair style" part 3A-2", an "eyes" part 3A-3", a "nose" part 3A-4, and a "mouth" part 3A-5" of a face. The number of part patterns may be more or less than 50 independence on the capacity of the ROM. Any ones of those patterns may be selected and combined using the select keys 22A, 22B disposed in the middle portion of the keyboard of FIG. 2. The 50th "eyes" part 3A-3 and the 50th "mouth" part 3A-5 each have a usual or calm expression.

FIGS. 4A, 4B, 4C each show part pattern data stored in a second storage area 3B of ROM 3 and related to change part patterns corresponding to "eyes" part 3A-3 and "mouth" part 3A-5 of the basic part pattern Nos. "1", "2", "3", . . . FIG. 4A shows patterns of an "eyes" part 3B-1A and a "mouth" part 3B-2A each indicative of a delightful expression. FIG. 4B shows patterns of an "eyes" part 3B-1B and a "mouth" part 3B-2B each indicative of a sad expression. FIG. 4C shows patterns of an "eyes" part 3B-1C and a "mouth" part 3B-2C each indicative of an angry expression.

FIG. 5 shows a storage table of conversation sentence data comprising question sentence data and response sentence, data and expression change data stored in a third storage area 3C of ROM 3.

First question sentence data "let's play ?" is stored along with a specified code X in a storage area 3C-1. By depression of the question designating key Q1 of FIG. 2, the stored specified code X and "Let's play ?" question sentence data are addressed and read. Second question sentence data "Please tell me an answer to our assignment ?" is stored along with a specified code Y in a storage area 3C-2. By the operation of the designating key Q2 of FIG. 2, the stored specified code Y and "please tell me an answer to our assignment"; are addressed and read. Third sentence data "Please forgive me ?" is stored along with a specified code Z in a storage area 3C-3. By depression of the question designating key Q3 of FIG. 2, the stored specified code Z and "Please forgive me ?" question sentence data are addressed and read.

The response sentence data items "OK", "NO" are stored along with specified codes S and T in storage areas 3C-4, 3C-5, respectively. By depression of "OK" key 21G and "NO" key 21H, the corresponding specified codes S and T are addressed and read.

The specified codes X, Y, Z, S and T are each comprised of 3 bits and differ one from the other.

Storage areas 3C-6, 3C-7 are provided in correspondence to the storage area 3C-1. Storage areas 3C-8, 3C-9 are provided in correspondence to the storage area 3C-2. Storage areas 3C-10, 3C-11 are provided in correspondence to the storage area 3C-3. These storage areas 3C-6 to 3C-11 store change data indicating which of change patterns stored in the ROM of FIGS. 4A, 4B, 4C are selected or that no change patterns are selected. The storage areas 3C-6, 3C-8 store data items which select the ROM of FIG. 4A. The storage area 3C-7 stores data which select the ROM of FIG. 4B. The storage area 3C-9 stores data which selects the ROM of FIG. 4C. The areas 3C-10, 3C-11 store data items which select no ROMs.

The data in the storage areas 3C-6, 3C-8, 3C-10 is read when the "OK" Key 21G is operated. The data in the storage areas 3C-7, 3C-9, 3C-11 is read when the "NO" Key 21H is operated.

FIG. 6 shows the internal structure of RAM 4. In FIG. 6, a display register 61 stores data displayed on the display 7 of FIG. 1.

A register f is a flag register which designates an operation mode. The data stored in the register n is changed to another in the sequence of "0"→"1"→"0" each time the M key 21A of the designating unit 21 of the FIG. 2 keyboard is operated for inputting purposes. "0" designates a normal mode in which calculation or transmission/reception can be performed. "1" designates a data creation mode in which montage creation or a calling or visiting card data inputting operation can be performed.

A register f is a flag register which designates a user mode or a different person mode. The data stored in the register f is changed alternately between "0" and "1" each time the F key 21B of the designating unit 21 of the FIG. 2 keyboard is operated for inputting purposes. "1" designates a user' montage creation mode. "0" designates a DB data/montage creation mode.

A register l is a flag register indicative of a transmission/reception mode. It stores "1" for the time period from when the transmitter/receiver unit 8 of FIG. 1 receives question data from the other party's device to the time when the transmitter/receiver unit 8 sends response data to the other party, and stores "0" if otherwise.

A user's montage data register 62 stores user's montage data similar to DB montage data.

DB registers 63-1, 63-2, 63-3, . . . each store montage data on each of user's friends along with his name, telephone number, and address, etc. The storage area for the montage data is divided into five data subareas for "contour", "hair", "eyes", "nose" and "mouth" which store corresponding numbers indicative of the basic part patterns of FIG. 3 selected by the keying-in operation.

The processing operation of CPU 1 of FIG. 1 will be described with reference to flowcharts of FIGS. 7–13.

Figure 7:
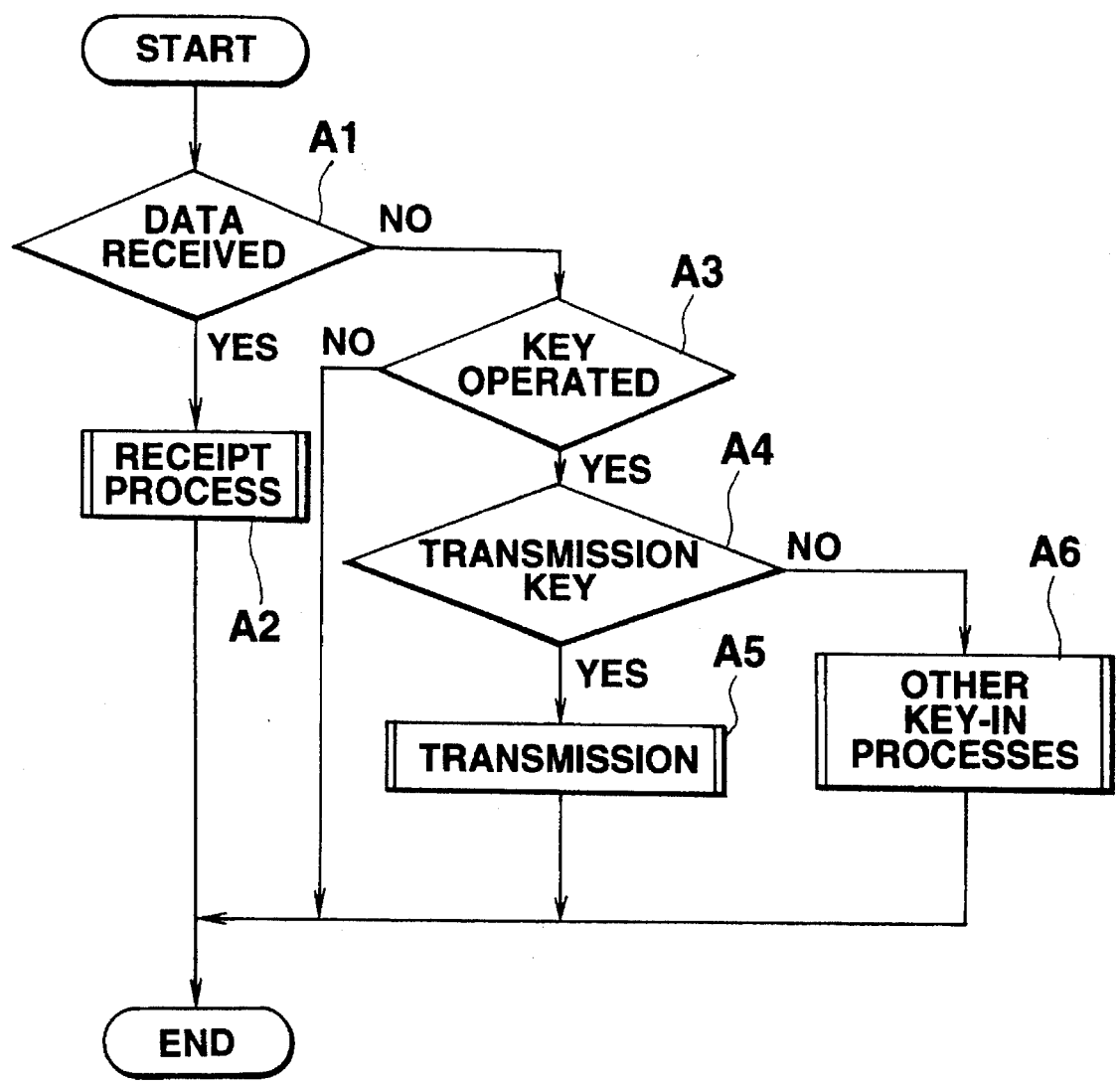
FIG. 7 is a general flowchart indicative of the operation of the device.

FIG. 7 is a general flowchart indicative of the whole flow of the program. In FIG. 7, first, at step A1 it is determined whether the transmitter/receiver unit 8 of FIG. 1 has received data sent by the other party. If so, control passes to step A2, where a receipt process to be described later is performed and the process is terminated.

If not at step A1, it is determined at step A3 whether a key is operated for inputting purposes at the keyboard of the key-in unit 2 of FIG. 2. If not, the processing is terminated at once. If so at step A3, control passes to step A4, where it is determined whether the key-in operation has been performed by the transmission key 21I.

If so at step A4, control passes to step A5, where a transmission process to be described later in more detail is performed and the process is terminated.

If not at step A4, control passes to step A6, where other key-in processes are performed and the process is terminated.

A montage creation process by keys among the other key-in operations at step A6 will be described with reference to a flowchart of FIG. 8. This process is started on the basis of a key-in operation by the montage creation key 21C at the keyboard of FIG. 2. Before this operation, the user's montage creation mode or the DB data/montage creation mode is beforehand designated by the operation of the F key 21B to thereby select any one of the user's montage data register 62 or DB registers 63-1, 63-2, 63-3, . . . of the FIG. 6 RAM and its corresponding montage area is used.

Figure 8:
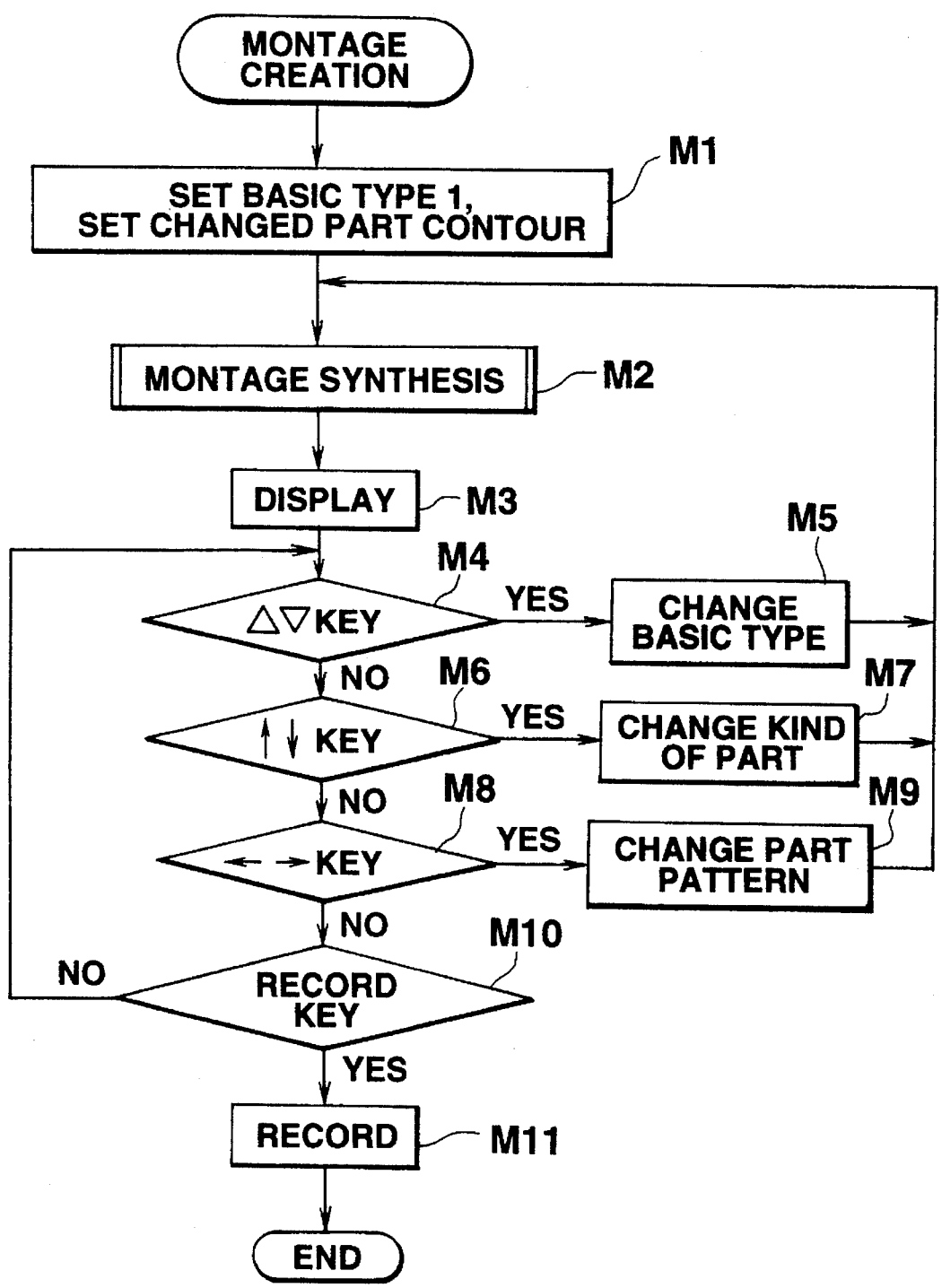
FIG. 8 is a flowchart indicative of a montage creation process performed in the device.

First, at step M1 of the FIG. 8 flowchart, "contour", "hair", "eyes", "nose", and "mouth" part patterns shown by No. 1 in the FIG. 3 ROM are selected as a basic type and the "contour" is then set initially as a changed part. At step M2 a montage synthesis process to be described later in more detail is performed. At step M3 the resulting montage is displayed on the display 7 through the FIG. 1 display driver 6 on the basis of the processed montage data. Thus, at the beginning, the montage comprising of the basic part patterns No. 1 is displayed and the "contour" of the montage is displayed in a "going-on-off or inverted manner as a change starting part.

At step M4 it is determined whether the triangular select key 22A or 22B is operated for inputting purposes at the selection unit 22 of the FIG. 2 keyboard. If not, it is determined at step M6 whether the cursor key 22C or 22D at the keyboard select unit 22 of FIG. 2 is operated for inputting purposes. If not at step M6, it is determined at step M8 whether the cursor key 22E or 22F is operated for inputting purposes at the select unit 22 of the FIG. 2 keyboard. If not, it is determined at step M10 whether the record key is operated for inputting purposes and control returns to step M4 to iterate the determination of the key-in operations at steps M4–M8.

If the select key 22A or 22B is operated for inputting purposes at step M4, control passes to step M5, where the set basic type is changed and then control returns to step M2 for montage synthesis. Thus, the basic patterns now in display are changed and displayed. At this time, if upward triangular select key 22A is operated for inputting purposes, the basic part pattern number of the montage displayed at present is changed to a basic part pattern number larger by one than the former one. If the downward triangular select key 22B is operated for inputting purposes, the basic part pattern number of the montage displayed at present is changed to a basic part pattern number smaller by one than the former one.

When the upward or downward arrowed cursor key 22C or 22D is operated for inputting purposes at step M6, control passes to step M7, where the kind of the part is changed and control returns to step M2 for montage synthesis process. Thus, one of the "contour", "hair", "eyes", "nose" and "mouth" which are the kinds of the parts of the basic part patterns displayed at present is displayed, for example, in a going-on-off manner on the display screen. Each time the upward arrowed cursor key 22C is operated for inputting purposes at this time, the montage displayed at present moves in a going-on-off manner sequentially in the sequence of "mouth"→"nose"→"eyes"→"hair"→"contour"→ "mouth". If the downward arrowed cursor key 22D is operated for inputting purposes, the part of the montage displayed at present changes to another in a going on-off manner sequentially in the sequence of "contour"→"hair"→ "eyes"→"nose"→"mouth"→"contour" each time that key is operated for inputting purposes.

If it is determined at step M8 that the leftward or rightward arrowed cursor key 22E or 22F has been operated for inputting purposes, control passes to step M9, where the pattern of the part is changed and control then returns to step M2 for montage synthesis. Thus, that of the currently displayed basic part patterns and displayed in a going-on-off manner is changed in accordance with the key-in operation.

At this time, if the leftward arrowed cursor key 22E is operated for inputting purposes, the part of the montage displayed at present in the going-on-off manner changes to another sequentially in the sequence of the No. 50 part → the No. 49 part ... → the No. 3 part→ the No. 2 part → the No. 1 part → the No. 50 part.

If the rightward arrowed cursor key 22F has been operated for inputting purposes, the part of the montage displayed at present in the going-on-off manner changes to another sequentially in the sequence of the No. 1 part→the No. 2 part→ the No. 3 part → . . . →the No. 50 part → the No. 1 part each time the key 22F is operated.

If the record key is operated for inputting purposes at step M10, control passes to step M11, where the kind of the part is changed. A montage is then synthesized at step M2, the data on the montage displayed at step M3 is recorded in a predetermined montage data area and the process is terminated.

Figure 9:
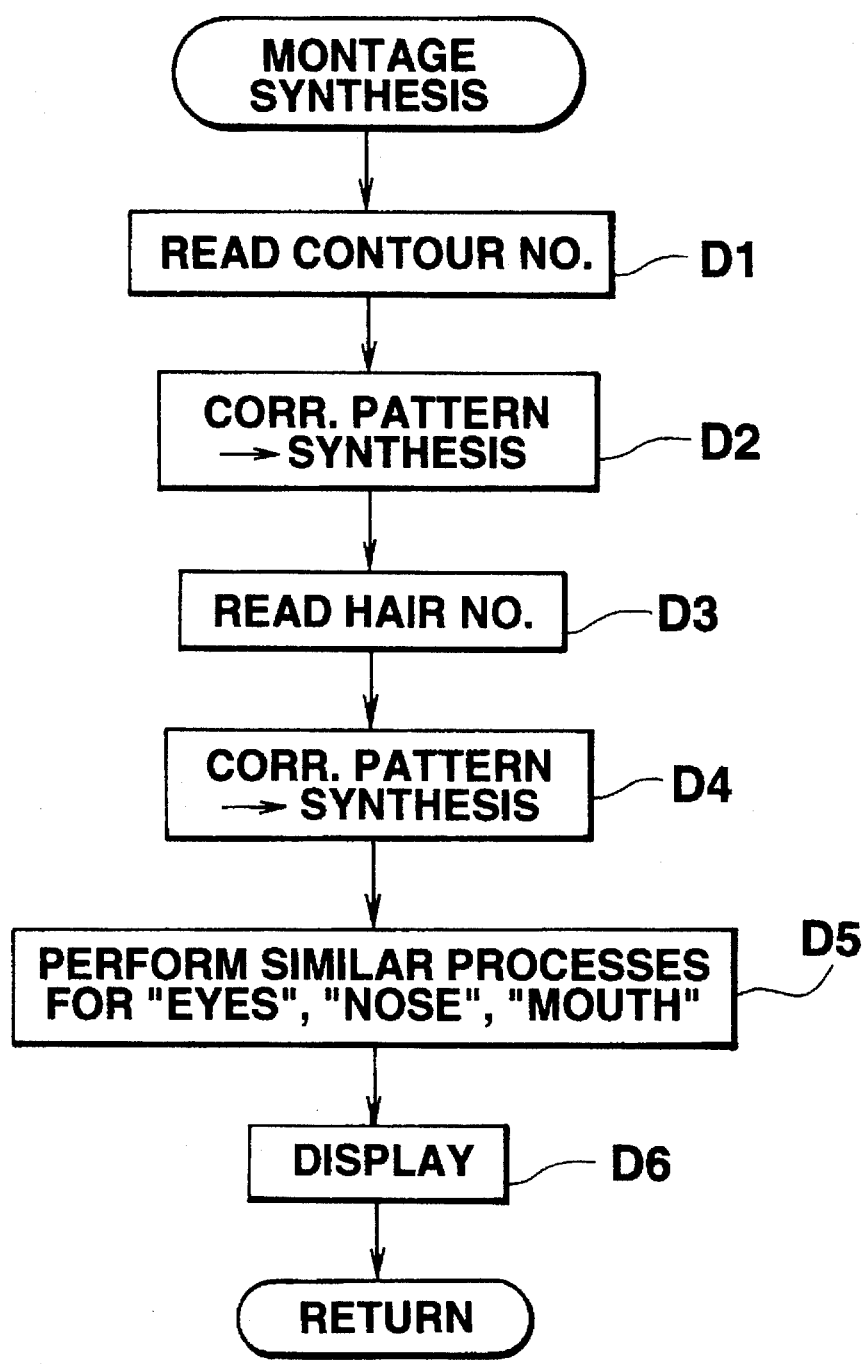
FIG. 9 is a flowchart indicative of a montage synthesis process performed in the device.

Subsequently, the montage synthesis at step M2 will described with reference to a flowchart of FIG. 9.

First, at step D1 the "contour" No. (a basic part pattern No. of the "contour" part 3A-1 of FIG. 3) set in the predetermined montage area is read. Data on the "contour" part 3A-1 indicated by the read basic part pattern number is read from the first storage area 3A in ROM 3 and stored in a predetermined area in the synthesis RAM 5.

Then at step D3 a "hair" No. (the basic part pattern No. of the "hair" part 3A-2 of FIG. 3) is read. At step D4 data on a "hair" part 3A-2 indicated by the read basic part pattern number is read from the first storage area 3A in ROM 3, and stored in a predetermined area in the synthesis RAM 5.

Then at step D5 the "eyes","nose", and "mouth" basic part pattern Nos. are read and data items on the "eyes", "nose", and "mouth" part patterns 3A-3, 3A-4,and 3A-5 indicated by the corresponding read basic part pattern numbers Nos. are read from the first storage area 3A in ROM 3, and stored in predetermined areas in the synthesis RAM 5. Thus, a montage image created in the synthesis RAM 5 is displayed on the display 7 of FIG. 1 at step D6.

Figure 10:
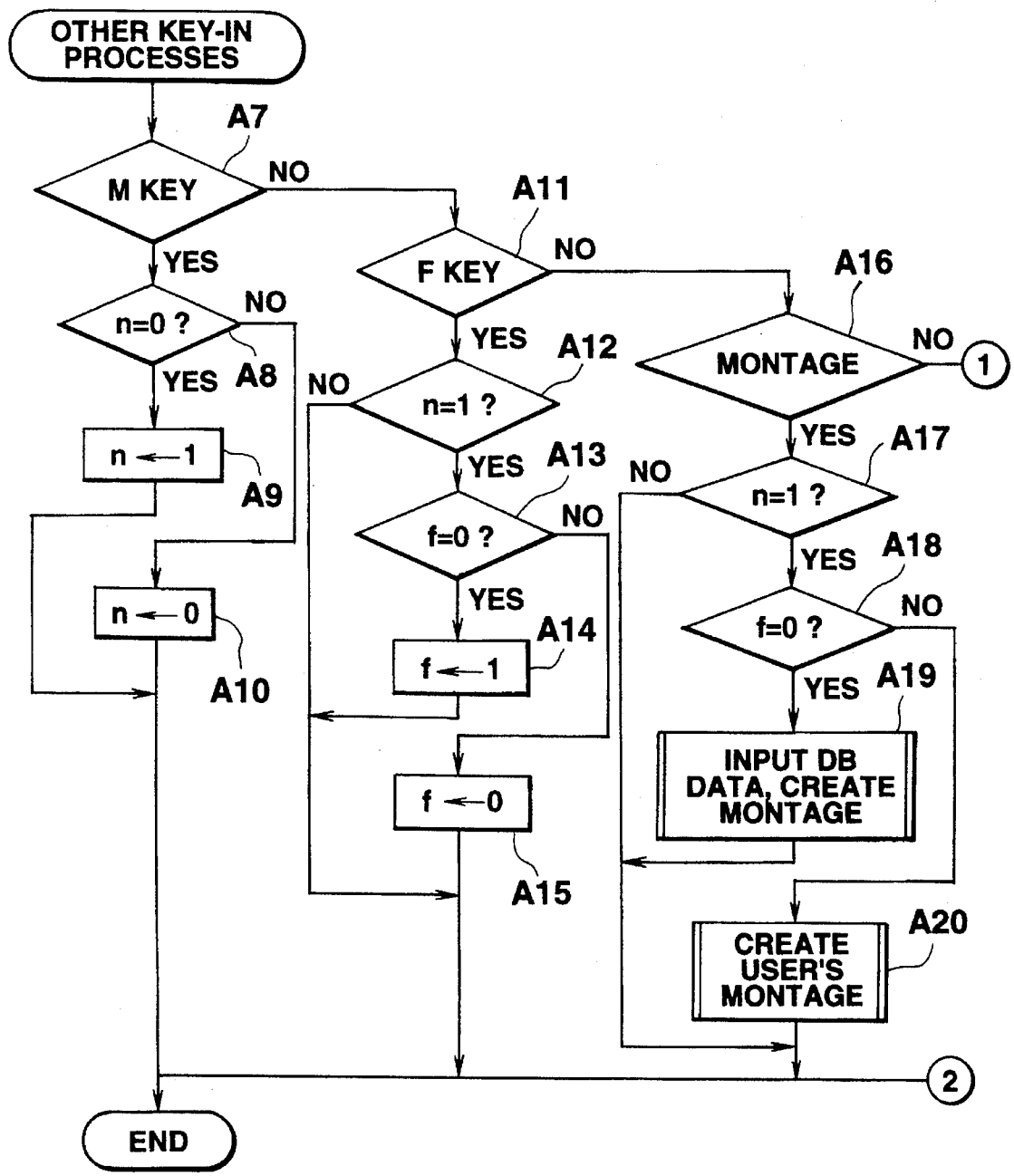
FIG. 10 is a flowchart indicative of other key-in processes performed in the device.
Figure 11:
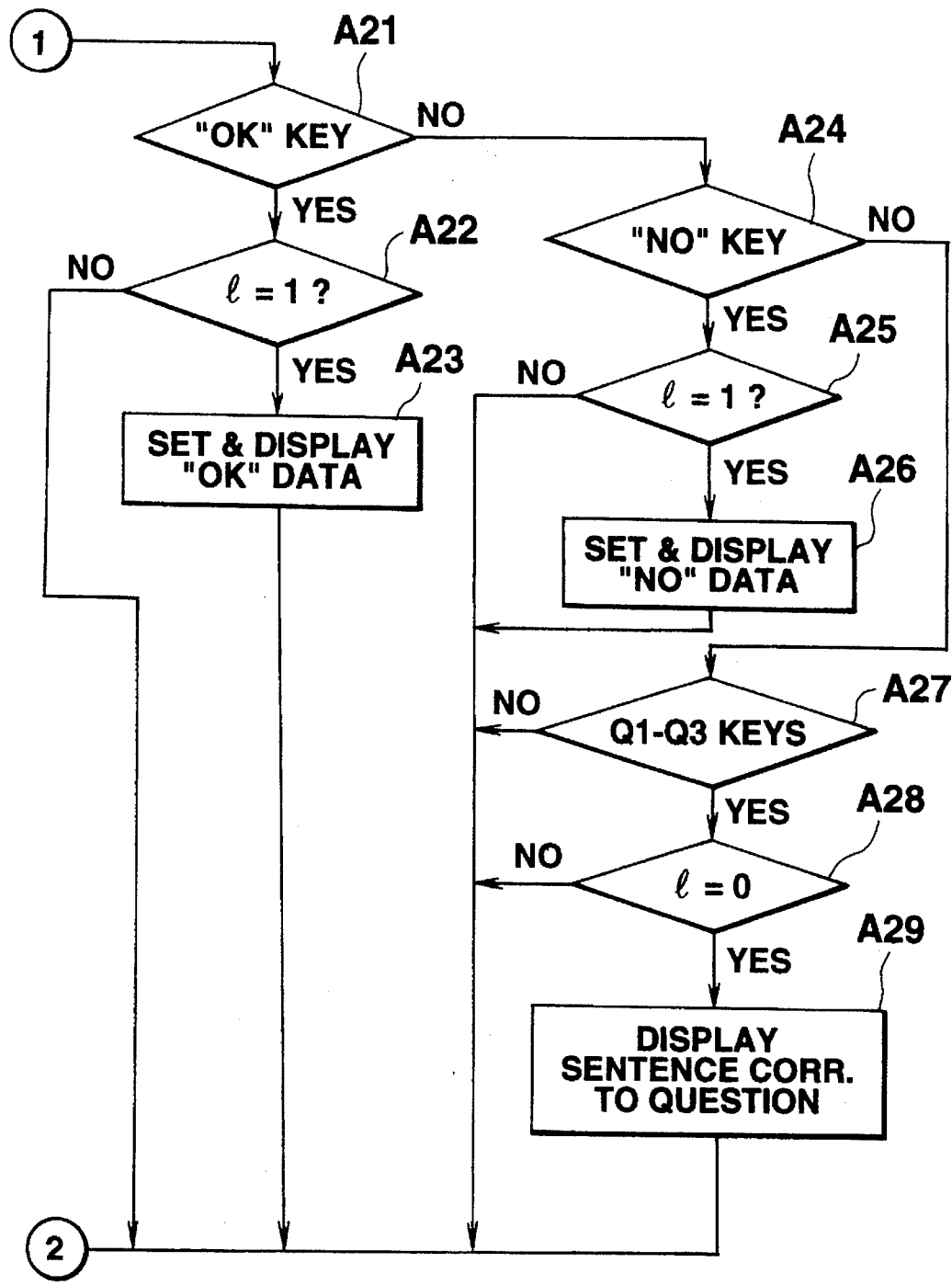
FIG. 11 is a flowchart indicative of other key-in processes performed in the device and combined with the flowchart of FIG. 10.

The other key-in processes at step A6 of FIG. 7 for than the montage creation will be described with reference to the flowcharts of FIGS. 10 and 11 which are connected to each other at (1) and (2) of FIGS. 10 and 11.

At step A7 it is determined whether the M key 21A is operated for inputting purposes. If so, it is determined at step A8 whether the value (flag) of the flag register n is "0". If so, control passes to step A9, where "1" is set in the flag register n to terminate the process. If the flag register is "1", control passes to step A10, where the "0" is set in the flag register n to terminate the process. Thus, each time the M key 21A is operated for inputting purposes, the flag of the flag register n is switched alternately between "0" and "1", so that the operation mode is switched alternately between the normal mode and the data creation mode.

If the M key 21A is not operated at step A7, control passes to A11, where it is determined whether the F key 21B is operated for inputting purposes. If so, control passes to step A12, where the flag of the flag register n is referred to, thereby determining whether the F key 21B is operated in the data creation mode.

If the flag of the flag register n is "1" at step A12, it is determined that the F key 21B is operated for inputting purposes in the data creation mode. In this case, control passes to step A13, where it is determined whether the flag of the flag register n is "0". If so, control passes to step A14, where "1" is set in the flag register f to terminate the process. If the flag of the flag register is "1" at step A13, control passes to step A15, where "0" is set in the flag register f to terminate the process. Thus, the flag of the flag register f is switched alternately between "0" and "1" each time the F key 21B is operated for inputting purposes in the data creation mode. Thus, the user's/other party's mode is switched alternately between the DB data montage creation mode and the user's montage creation mode.

If the flag of the flag register n is "0" at step A12, it is determined that the F key 21B is operated in the normal mode to thereby terminate the process at once. Thus, in the normal mode, the key-in operation of the F key 21B is ignored.

If the key-in operation of the F key 21B is not performed at step A11, control passes to step A16, where it is determined whether the montage creation key 21C is operated for inputting purposes. If so, control passes to step A17, where the flag of the flag register n is referred to, thereby determining whether the montage creation key 21C is operated in the data creation mode.

If the flag of the flag register n is "1" at step A17, it is determined that the montage creation key 21C is operated in the data creation mode. In this case, at step A18 the flag of the flag register f is referred to, thereby determining which of the user's and other party's modes is set.

If the flag of the flag register f is "0", it is determined that the DB data montage creation mode is set now. In this case, control passes to step A19, where the DB data is input and the DB montage creation described in the flowchart of FIG. 8 is performed to thereby terminate the process.

If the flag is "1" at step A18, it is determined that the user's montage creation mode is set. In this case, control passes to step A20, where the user's montage creation described with reference to the FIG. 8 flowchart is performed and the process is then terminated.

Figure 14A:
FIGS. 14A and 14B illustrate user's and the other party's montage data.
Figure 14A:
Figure 14B:
Figure 14B:
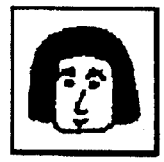

Thus, for example, as shown in FIG. 14A, selected "contour", "hair", "nose", "eyes", and "mouth" parts having basic part pattern Nos. "2", "3", "1", "1 " and "2", respectively, and a user's montage synthesized from those parts in the user's montage creation mode of the user's device are recorded in the user's montage data register 62 of FIG. 6. In the other party's device which, for example, a girl has, selected "contour", "hair", "nose", "eyes", and "mouth" parts having basic part pattern Nos. "1", "2", "2", "2" and "1", respectively, and a girl's montage synthesized from those parts are recorded in a girl's montage data register such as 62, as shown in FIG. 14B.

If the flag of the flag register n is "0" in the determination at step A17, the process is terminated at once. Thus, the key-in operation of the montage creation key 21C performed in the normal mode is ignored.

If no montage creation key 21C is determined to be operated at step A16, control passes to step A21, where it is determined whether the "OK" key 21G is operated for inputting purposes. If so, control passes to step A22, where the flag of the flag register l is referred to, thereby determining whether the "OK" key 21G is operated in the transmission/reception mode during transmission of the response data.

If the flag of the flag register l is "1", it is determined that it is now in a response data transmission period after question data is received from the other party to be described later. Thus, control passes to step A23, where response data "OK" is set in the display register 61 and also is displayed on the display 7.

If at step A22 the flag of the flag register 1 is "0", the process is terminated at once. Thus, the key-in operation of the "OK" key 21G is ignored except in the response data transmission period.

If at step A21 the key-in operation of "OK" key 21G is not performed, control passes to step A24, where it is determined whether the "NO" key 21H is operated for inputting purposes. If so, control passes to step A25, where the flag of the flag register 1 is referred to, thereby determining whether the "NO" key 21H is operated in the transmission/reception mode during the response data transmission period.

If the flag of the flag register 1 is "1", it is determined whether it is now in the response data transmission period and control passes to step A26, where "NO" data is set and "NO" is displayed on the display 7.

If at step A25 the flag of the flag register 1 is "0", the process is terminated at once. Thus, the key-in operation of the "NO" key 21H is ignored except in the response data transmission period.

If at step A24 the key-in operation of the "NO" key 21H is not performed, control passes to step A27, where it is determined whether any one of Q1 key 21D, Q2 key 21E and Q3 key 21F is operated for inputting purposes. If so, control passes to step A28, where the flag of the flag register 1 is referred to, thereby determining whether the key-in operation of that key is performed in the question data transmission period.

If the flag of the flag register 1 is "0", it is determined that it is now in the question data transmission period. Control then passes to step A29, where, as shown in FIG. 5, "Let's play ?" data, "Please tell me an answer to our assignment ?" data, and "Please forgive me ?" data are displayed on the display register 61 when the Q1 key 21D, Q2 key 21E, and Q3 key 21F, respectively, are operated for inputting purposes.

If at step A28 the flag of the flag register 1 is "1", the process is terminated at once. Thus, the key-in operation of the Q1 key 21D, Q2 key 21E or Q3 key 21F is ignored except in the question data transmission period.

Figure 12:
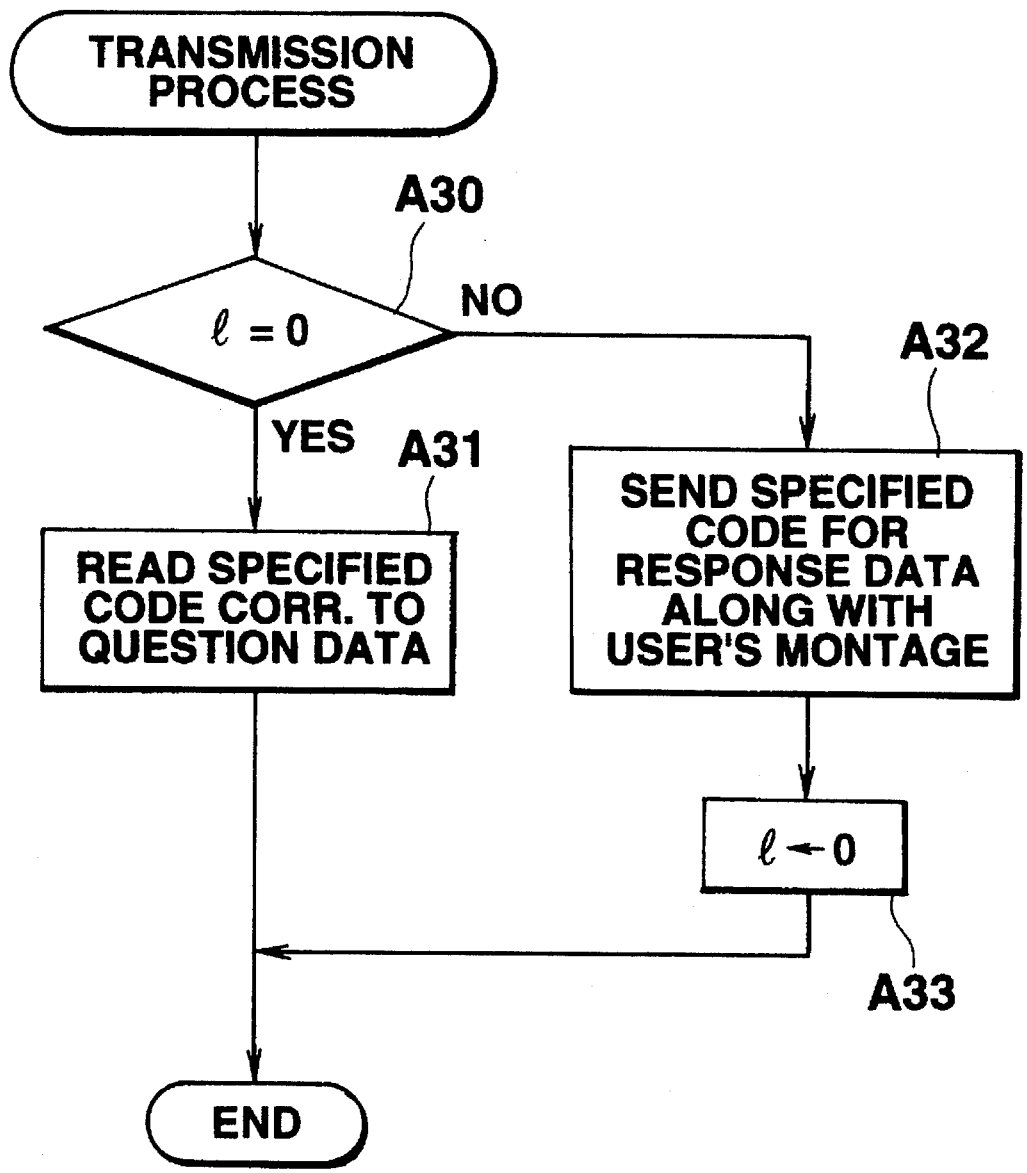
FIG. 12 is a flowchart indicative of a transmission process performed in the device.

The transmission at step A5 of FIG. 7 of the montage, question or response data, set as mentioned above, will be described with reference to the flowchart of FIG. 12. First, at step A30 it is determined whether the flag of the flag register 1 is "0". If so, it is determined that it is now in the question data transmission period. Control then passes to step A31, where specified code data corresponding to the question data set in the display register 61 by the Q1 key 21D, Q2 key 21E or Q3 key 21F and displayed on the display 7 is read from ROM 3. If, for example, the question sentence "Let's play ?" is displayed by the operation of the Q1 key 21D, a specified code X is read from a third storage area 3C-1 of ROM 3. If "Please tell me an answer to our assignment ?" or "Please forgive me ?" has been displayed by the operation of the Q2 key 21E or Q3 key 21F, a specified code Y or Z is read. The read specified code is sent along with corresponding number data stored in the user's montage data register 62.

The sent specified code and montage number data are processed by a receipt process to be described later and displayed as a question sentence and a montage on the display of the other party.

If at step A30 the flag of the flag register 1 is "1", it is determined that it is now in the response data transmission period. Thus, control passes to step A32, where a specified code S or T corresponding to a response sentence set and displayed by the "OK" key 21G or the "NO" key 21H is read from the third storage area 3C-4 or 3C-5. Data in one of the storage areas 3C-6 to 3C-11 is read depending on the answer to that of the question sentences for which the "OK" key 21G or "NO" key 21H is operated, and sent along with its number data stored in the user's montage data register 62.

If at step A30 the flag of the flag register 1 is "1", it is determined that it is now in the response data transmission period. Thus, control passes to step A32, where a specified code for the response data set by the "OK" 21G or "NO" key 21H and displayed on the display 7 is sent along with the user's montage data.

Subsequent to step A32, control passes to step A33, where the flag of the flag register 1 is set at "0" to thereby set the end of the response period.

Figure 13:
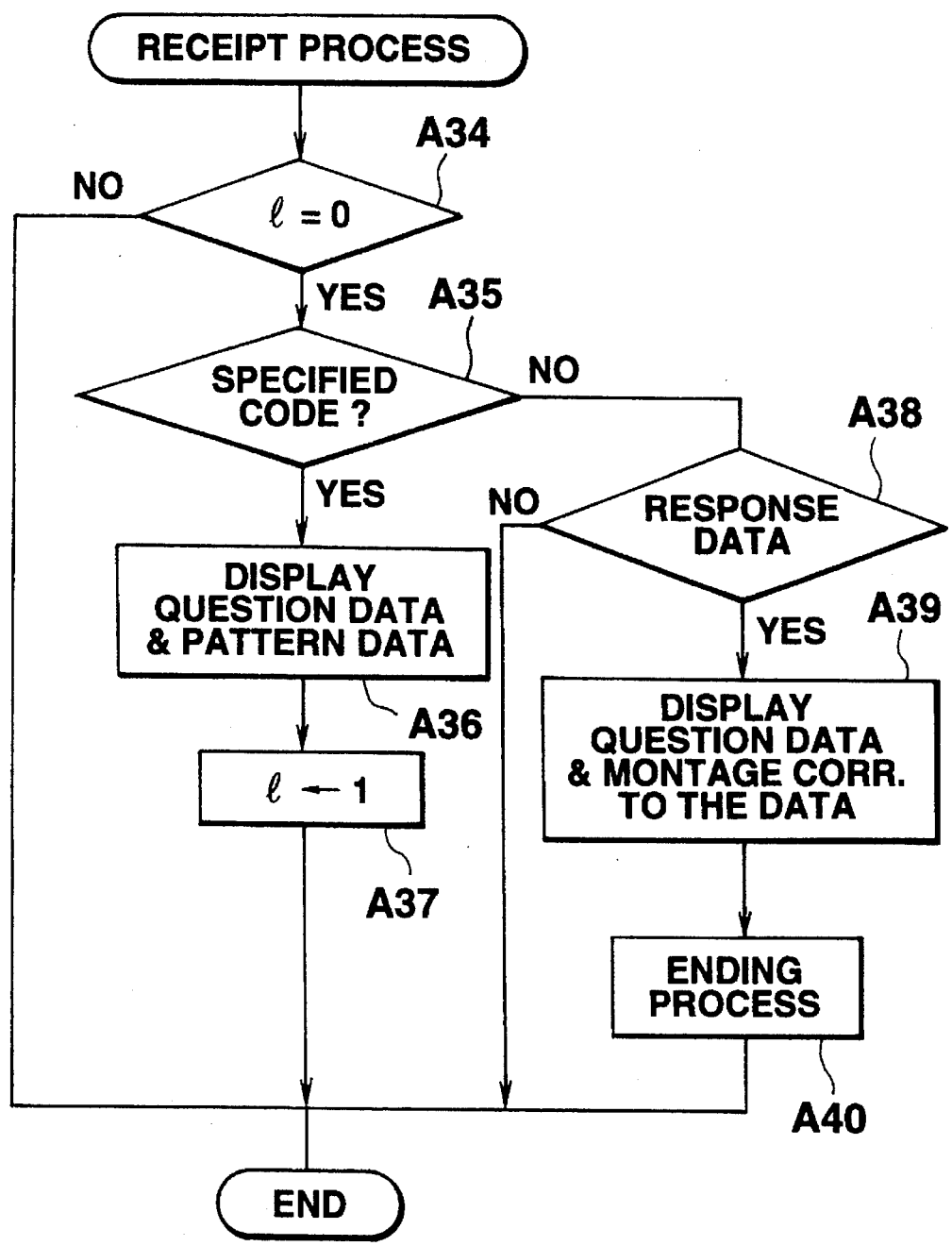
FIG. 13 is a flowchart indicative of a receipt process performed in the device.

Subsequently, the receipt process at step A2 of FIG. 7 performed when the sent data is received will be described with reference to the flowchart of FIG. 13.

First, at step A34 it is determined whether the flag of the flag register 1 is "0". If so, it is determined that it is now in the reception period in the transmission/reception mode. Thus, control passes to step A35, where it is determined whether the received data is a specified code for the question data. If so, control passes to step A36, where the storage area where the specified code received from one of the third storage areas 3C-1, 3C-2 and 3C-3 of ROM 3 is stored is retrieved and the question sentence data stored in that area is displayed on the display 7. Pattern data is read from the first storage area 3A on the basis of the number data for the received montage data and displayed on the display 7.

Subsequently, at step A37 the flag of the flag register 1 is set at "1" for thereby terminating the process. Thus, a transmission period for the response data to the received question data is set.

When at step A35 the received specified code data is determined to be not for a specified code corresponding to the question data, control passes to step A38, where it is determined whether the received data is for a specified code corresponding to the response sentence. If so, control passes to step A39, where response characters for the corresponding response sentence data are read from the storage area 3C-4 or 3-C5 and displayed on the display 7, and number data on the "eyes" part 3A-3 and "mouth" part 3A-5 of the received montage number data are converted to "eyes" expression change pattern data and "mouth" expression change pattern data corresponding to the changed data received at the same time, and displayed on the display 7.

Subsequent to step A39, the ending process is performed at step A40 to terminate the process. This process involves display of the received response data for a predetermined period of time and then erasure of the display.

Figure 15:
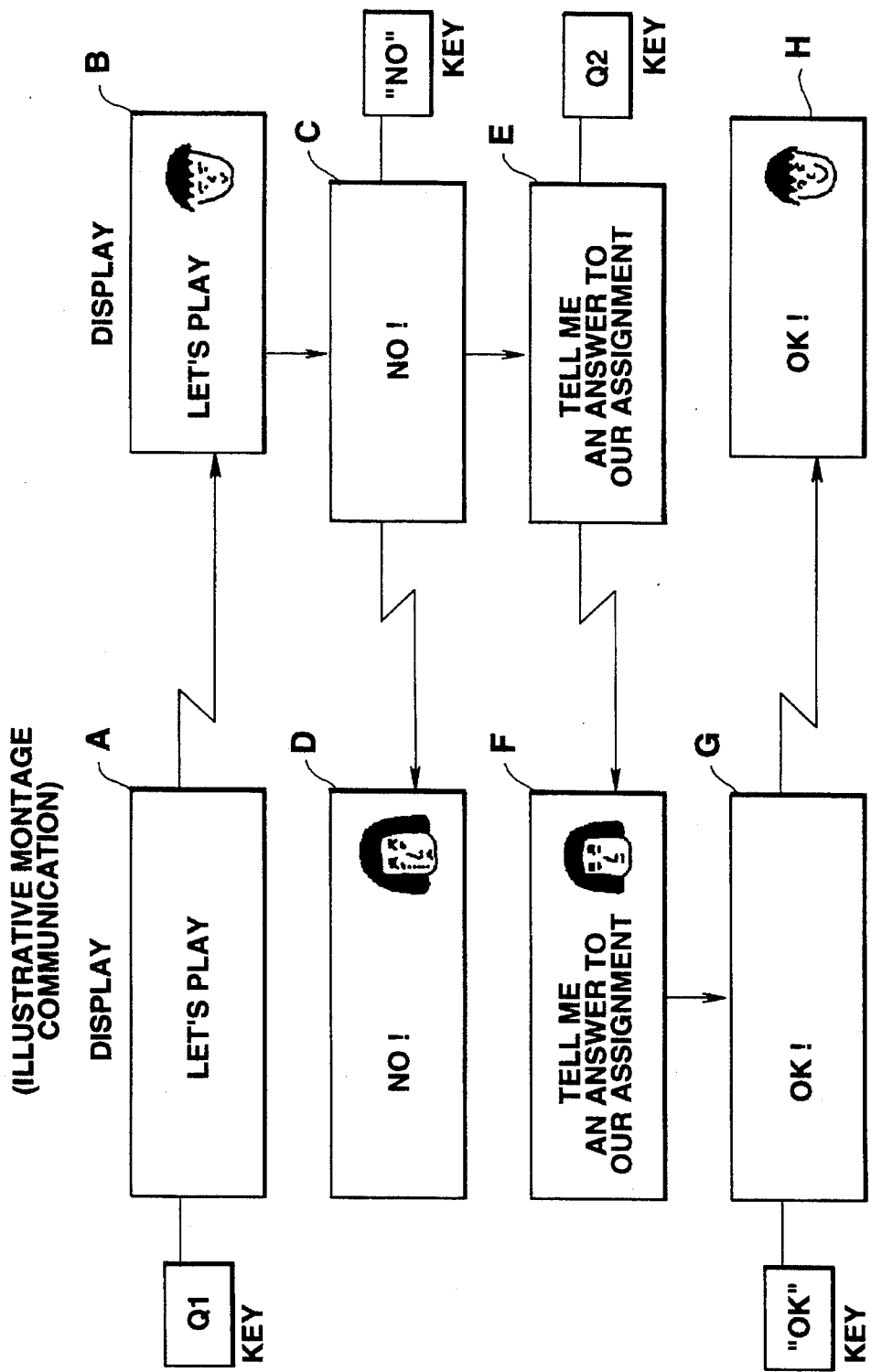
FIGS. 15 illustrates communication made between the user's device and the other party's device.

By the above processing, for example, as shown by A by A in FIG. 15, "Let's play" data is selected by the Q1 key 21D, in the user's device and subsequent operation of the transmission key 21I is performed; The specified code X is sent along with the number data of the user's montage data of FIG. 14A to the other party's device. By the receipt process in the other party's device, the sentence "Let's play" and the montage are displayed on the display of the other party's device as shown by B in FIG. 15; and change "in FIG. 15C" to by E in FIG. 15. As shown by C in FIG. 15 when the data "Please TELL me an answer to our assignment ?" is set by the Q2 key 21E, and transmission key 21I is operated in the other party's device, the specified code Y in the storage area 3C-1 of FIG. 5 is sent along with the other party's montage data to the user's device, so that by the receipt process the "Please TELL me an answer to our assignment ?" and the other party's montage are displayed on the user's display 7 as shown by F in FIG. 15.

When the "OK" key 21G or "NO" key 21H is operated to set response data and the transmission key is operated in the state where the question sentence from the other party and the other party's montage are displayed on the display 7, the specified code corresponding to the response data and the user's montage data are sent.

For example, as shown by G in FIG. 15, the user's montage data of FIG. 14A is sent by his device to the other party's device along with the specified code S for the "OK" data set by the "OK" key 21G as a response to the receipt of the "Please TELL me an answer to our assignment" data. By the reception process in the other party device, "OK" and the user's montage are displayed on the display of the other party's device. In this case, since the response "OK" to the question "Please TELL me an answer to our assignment" is received, change data stored in the area 3C-8 of FIG. 5 is read and the expressions of "eyes" and "mouth" of the montage the data of which is received are replaced with the read change data for a delightful montage expression on the display. For example, as shown by C in FIG. 15, when a specified code T corresponding to "NO" set by the "NO" key of the other party device as a response to receipt of the "Let's play" data is sent along with the girl's montage data, "NO" and a montage having a "sad" expression change pattern of FIG. 4B are displayed on the user's display 7, as shown by D in FIG. 15.

As described above, in the present embodiment, even if no conversation sentence data itself is sent by radio, satisfactory communication is achieved. Data on an image such as a montage is sendable or the contents of the image are changeable in accordance with the contents of the conversation sentences so that the user can inform the other party of his feeling by using his image.

While in the present embodiment one of three kinds of questions is illustrated as being selected or designated, the number of questions selectable is not limited to three. More kinds of questions may be prepared such that any one of them can be selected by a key. While one of the two kinds of responses is illustrated as being selected or designated, three or more kinds of responses may be prepared such that any one of them may be selected. While the receiving end converts the "eyes" and "mouth" part patterns to other part patterns independence on the kind of the responses, the sending end may change the "eyes" and "mouth" part pattern data to other part pattern data depending on the kinds of the response and then send the changed data to the receiving end.

What is claimed is:

1. A radio communication device for exchanging data with another radio communication device, comprising:

image pattern data storage means for storing a plurality of image pattern data for each of parts of a face, the plurality of image pattern data corresponding respectively to a plurality of code data;

image pattern data selecting means for designating code data to select image pattern data from among the image pattern data stored in said image pattern data storage means, and for combining the selected image pattern data to obtain image data of a face;

image data storing means for storing image data of a face obtained by said image pattern data selecting means;

conversation sentence data storage means for storing a plurality of conversation sentence data, which correspond respectively to a plurality of code data;

conversation sentence selecting means for selecting one conversation sentence data from among the plurality of conversation sentence data stored in said conversation sentence data storage means;

sending means for sending to the another radio communication device by means of radio signals, code data of image pattern data included in the image data obtained by said image pattern data selecting means and code data of the conversation sentence data selected by said conversation sentence selecting means;

receiving means for receiving a radio signal of code data of image data and a radio signal of conversation sentence data, both sent from the another radio communication device;

reading means for reading out from said image pattern data storage means image pattern data corresponding to code data of the image data which are included in the radio signal received by said receiving means, and for reading out from said conversation sentence data storage means conversation sentence data corresponding to code data of the conversation sentence data received by said receiving means;

display means for displaying the image pattern data and the conversation sentence data, both read out by said reading means; and display control means for controlling said reading means to read out from said image pattern data storage means image pattern data different from the image pattern data previously read out by said reading means, when the conversation sentence data read out by said reading means is a previously determined conversation sentence data, and for controlling said display means to display the image pattern data last read out by said reading means.

2. A radio communication device according to claim 1, wherein said sending means and said receiving means comprise an infrared data sending circuit and an infrared data receiving circuit, respectively.

3. A radio communication device according to claim 1, wherein the plurality of conversation sentence data stored in said conversation sentence data storage means comprise question conversation data and response conversation data to the question conversation data.

4. A radio communication device according to claim 1, wherein said conversation sentence selecting means comprises a plurality of operation keys for selecting one of the plurality of conversation sentence data stored in the conversation sentence data storage means, the plurality of operation keys corresponding respectively to the plurality of conversation sentence data stored in said conversation sentence data storage means.

5. A radio communication device for exchanging data with another radio communication device, comprising:

image pattern data storage means for storing a plurality of image pattern data for each of parts of a face, the plurality of image pattern data corresponding respectively to a plurality of code data;

image pattern data selecting means for designating code data to select image pattern data from among the image pattern data stored in said image pattern data storage means, and for combining the selected image pattern data to obtain image data of a face;

image data storing means for storing image data of a face obtained by said image pattern data selecting means;

conversation sentence data storage means for storing a plurality of conversation sentence data, which correspond respectively to a plurality of code data;

conversation sentence selecting means for selecting one conversation sentence data from among the plurality of conversation sentence data stored in said conversation sentence data storage means;

sending means for sending to the another radio communication device by means of radio signals, code data of image pattern data included in the image data obtained by said image pattern data selecting means and code data of the conversation sentence data selected by said conversation sentence selecting means;

receiving means for receiving a radio signal of code data of image data and a radio signal of conversation sentence data, both sent from the another radio communication device;

reading means for reading out from said image pattern data storage means image pattern data corresponding to code data of the image data which are included in the radio signal received by said receiving means, and for reading out from said conversation sentence data storage means conversation sentence data corresponding to code data of the conversation sentence data received by said receiving means;

display means for displaying the image pattern data and the conversation sentence data, both read out by said reading means; and display control means for controlling said reading means to read out from said image pattern data storage means image pattern data related to a change of state of the image pattern data corresponding to the code data received in the radio signal by said receiving means, which change of state corresponds with the conversation sentence data read out by said reading means, and which conversation sentence data is a previously determined conversation sentence data, and for controlling said display means to display the image pattern data last read out by said reading means.

* * * * *